(12) United States Patent
Fuse et al.

(10) Patent No.: US 10,001,327 B2
(45) Date of Patent: Jun. 19, 2018

(54) HEAT STORING SYSTEM

(71) Applicant: DENSO CORPORATION, Kariya, Aichi-pref. (JP)

(72) Inventors: Takuya Fuse, Kariya (JP); Yasushi Kouno, Kariya (JP); Shinya Kasamatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/327,055

(22) PCT Filed: Sep. 23, 2015

(86) PCT No.: PCT/JP2015/004825
§ 371 (c)(1),
(2) Date: Jan. 18, 2017

(87) PCT Pub. No.: WO2016/056185
PCT Pub. Date: Apr. 14, 2016

(65) Prior Publication Data
US 2017/0167803 A1  Jun. 15, 2017

(30) Foreign Application Priority Data
Oct. 8, 2014  (JP) .................................. 2014-207113

(51) Int. Cl.
*F28D 15/00* (2006.01)
*F28D 20/02* (2006.01)
(Continued)

(52) U.S. Cl.
CPC ......... *F28D 20/02* (2013.01); *B60H 1/00492* (2013.01); *C01G 31/02* (2013.01);
(Continued)

(58) Field of Classification Search
CPC .. F16H 57/0417; F16H 57/0483; F28D 20/02; F28D 20/0056; F28D 2020/0013;
(Continued)

(56) References Cited

U.S. PATENT DOCUMENTS 6,116,330 A * 9/2000 Salyer ................... F28D 20/023
165/10
6,313,391 B1 * 11/2001 Abbott ....................... F24J 2/34
136/200

(Continued)

FOREIGN PATENT DOCUMENTS

JP    H06-143981 A    5/1994
JP    2013-108748 A    6/2013

*Primary Examiner* — Davis Hwu
(74) *Attorney, Agent, or Firm* — Posz Law Group, PLC

(57) ABSTRACT

A heat storing system includes: a heat source that emits heat to a first thermal medium; and a heat storing unit. The heat storing unit includes a heat storing body container housing a heat storing body, and a thermal medium container housing a liquid phase thermal medium. The heat storing body stores or emits heat in accordance with phase change of the heat storing body. The heat storing unit is configured to conduct a cold heat emission mode in which the liquid phase thermal medium and a cooling medium exchange heat in the thermal medium container to evaporate the thermal medium such that cold heat is emitted to the cooling medium.

10 Claims, 6 Drawing Sheets

(51) Int. Cl.
  *C09K 5/02*  (2006.01)
  *B60H 1/00*  (2006.01)
  *C01G 31/02*  (2006.01)
  *C09K 5/04*  (2006.01)
  *F01P 3/20*  (2006.01)
  *F28D 20/00*  (2006.01)
  *F28D 21/00*  (2006.01)

(52) U.S. Cl.
  CPC ............... *C09K 5/02* (2013.01); *C09K 5/048* (2013.01); *F01P 3/20* (2013.01); *F28D 20/0056* (2013.01); *C01P 2006/36* (2013.01); *F28D 2020/0013* (2013.01); *F28D 2021/0094* (2013.01); *Y02E 60/142* (2013.01); *Y02E 60/145* (2013.01)

(58) Field of Classification Search
  CPC ....... F28D 2021/0094; F28D 2021/008; F28D 20/021; F28D 20/023; F01N 5/02; F01N 3/206; B60H 1/00492; C01G 31/02; C09K 5/02; C09K 5/048; F01P 3/20; C01P 2006/36; Y02E 60/142; Y02E 60/145
  USPC ................................................... 165/104.17
  See application file for complete search history.

(56) References Cited

U.S. PATENT DOCUMENTS

2011/0067419 A1   3/2011   Aoyagi
2015/0241137 A1*  8/2015   France ................. F28D 20/021
                                                  126/619

\* cited by examiner

HEAT STORING MODE

COLD HEAT EMISSION MODE

HOT HEAT EMISSION MODE

COLD AND HOT HEAT EMISSION MODE

AIR TO BE SENT

HEAT STORING SYSTEM

CROSS REFERENCE TO RELATED APPLICATIONS

This application is a U.S. national stage of International Patent Application No. PCT/JP2015/004825 filed on Sep. 23, 2015 and is based on Japanese Patent Application No. 2014-207113 filed on Oct. 8, 2014, the disclosure of which is incorporated herein by reference.

TECHNICAL FIELD

The present disclosure relates to a heat storing system.

BACKGROUND ART

In a vehicle having an engine (internal combustion engine) as an energy converter, a temporal gap and a spatial gap tend to occur in each of a stationary condition in which an excess heat is generated and a starting condition in which heat is required. Accordingly, a heat storing system is proposed, which stores a part of heat radiated from the engine in the stationary condition and radiates the heat stored therein in the starting condition.

For example, a heat storing system is known, which stores heat in a sensible heat storing body using a specific heat of a substance. Further, a heat storing system is known, which stores heat in a chemical heat storing body using a heat of chemical reaction (for example, refer to Patent Literature 1).

PRIOR ART LITERATURES

Patent Literature

Patent Literature 1: JP 2013-108748 A

SUMMARY OF INVENTION

However, in the heat storing system using the sensible heat storing body, it is generally difficult to store heat densely since a heat storing amount depending on a heat capacity of the heat storing body is small. As a result, the size may be large when configuring a sensible heat storing system to meet a heat storing amount and a heat radiation amount required for the system.

The heat storing system using the chemical heat storing body can store heat, in addition to sensible heat and latent heat, using an enthalpy in a chemical reaction. A reaction speed of the chemical reaction, generally, heavily depends on a temperature. A high temperature is thereby required for a quick proceed of the chemical reaction.

As a result, it may be difficult to store heat densely since the chemical reaction hardly proceeds in the heat storing body when a temperature of the heat source (the engine) is low. That is, the heat storing system using the chemical heat storing body may not receive the advantage enabling the use of the enthalpy in the chemical reaction depending on a temperature of the heat source.

Further, in the above-described heat storing system, in case where the hot heat of the heat source is stored in the heat storing body, the warm heat can be output when emitting heat. However, a cold heat cannot be taken out.

It is an objective of the present disclosure to provide a heat storing system which is able to output cold heat when emitting heat and to store hot heat densely regardless of a temperature of a heat source, while the size can be reduced.

According to an aspect of the present disclosure, a heat storing system includes: a heat source that generates heat and emits the heat to a first thermal medium; and a heat storing unit including a heat storing body storing heat. The heat storing unit includes a heat storing body container housing the heat storing body, and a thermal medium container housing a liquid-state second thermal medium that is evaporated by removing heat of a third thermal medium flowing outside the thermal medium container. The heat storing body container is configured to receive vapor of the second thermal medium generated in the thermal medium container. The heat storing body has a pore receiving the vapor of the second thermal medium. The heat storing body is configured to change to a solid-state first phase when the heat storing body has a temperature not more than a phase transition temperature and change to a solid-state second phase when the heat storing body has a temperature exceeding the phase transition temperature. The heat storing body is configured to store or emit heat in accordance with phase change between the first phase and the second phase. The heat storing unit is configured to be switchable between a heat storing mode to store heat of the first thermal medium in the heat storing body by heat exchange between the first thermal medium and the heat storing body in the heat storing body container, and a cold heat emission mode to emit cold heat to the third thermal medium to cool the third thermal medium by heat exchange between the liquid-phase second thermal medium and the third thermal medium in the thermal medium container to evaporate the second thermal medium.

According to the above-described configuration the heat storing body stores heat due to the phase transition between the first phase in the solid state and the second phase in the scud state, and thereby the heat storing body can store heat more densely as compared to a sensible heat storing body. As a result, a size of the heat storing system can be decreased.

Furthermore, the heat storing body can store heat densely as well when a temperature of the heat source is low since the heat storing body stores or radiates heat without using a chemical reaction. That is, the heat storing body can store heat densely regardless of a temperature of the heat source.

The heat storing unit is configured to be able to perform a cold heat emission mode to emit cold heat to the third thermal medium to cool the third thermal medium by evaporating the second thermal medium through heat exchange between the liquid-phase second thermal medium and the third thermal medium in the thermal medium container. Further, because the heat storing body has a pore receiving the vapor of the second thermal medium, the vapor of the second thermal medium evaporated in the thermal medium container can be adsorbed into the pore of the heat storing body. Accordingly, the cold heat can be taken out when the heat storing unit emits heat.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments will be described hereafter referring to drawings. In the embodiments, a part that corresponds to or equivalents to a matter described in a preceding embodiment may be assigned with the same reference number.

First Embodiment

A first embodiment will be described hereafter referring to FIG. 1 to FIG. 5. According to the present embodiment, a heat storing system stores heat exhausted from an engine (internal combustion engine) used as one of driving power sources for a hybrid car (vehicle).

Figure 1:
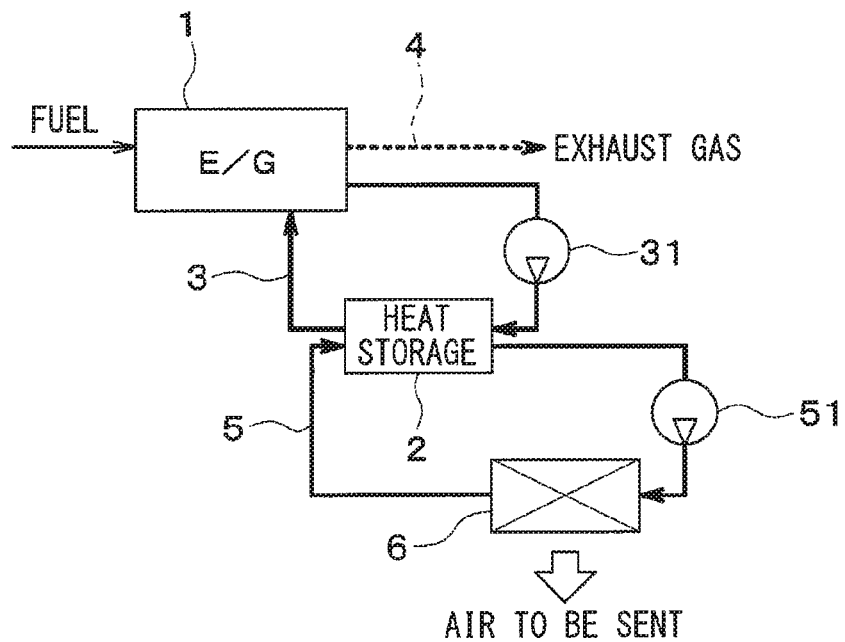
FIG. 1 is a diagram illustrating a whole configuration of a heat storing system according to a first embodiment.

As shown in FIG. 1, the heat storing system of the present embodiment is configured as a system that transfers heat from an engine 1 to a heat storing body 2 through a cooling water and stores the heat in the heat storing body 2.

The engine 1 corresponds to a heat source and an energy converter that radiates heat to the cooling water when converting a fuel, which is supply energy from an outside, into power, which is energy in another form. The cooling water is liquid that receives or supplies heat relative to the engine 1. The cooling water corresponds to a first thermal medium.

The engine 1 and the heat storing body 2 are connected to each other by a cooling water passage 3 that provides a closed circuit between the engine 1 and the heat storing body 2. A first pump 31, which is a mechanical pump or an electronic pump, is disposed in the cooling water circuit 3 and circulates the cooling water in the cooling water circuit 3. The cooling water in the cooling water circuit 3 circulates from a cooling water outlet of the engine 1 to a cooling water inlet of the engine 1 via the heat storing body 2.

The engine 1 is connected with an exhaust passage 4 in which exhaust gas that is a gas discharged from the engine 1 flows.

The heat storing body 2 is configured to store heat of the cooling water that has a high temperature by exchanging heat with the exhaust gas from the engine 1. Further, the heat storing body 2 is configured to emit cold heat to a cooling medium flowing outside of the heat storing body 2. Details of the heat storing body 2 are described later.

The heat storing unit 2 is connected with a cooling medium passage 5 allowing cooling medium to flow therethrough. The cooling medium passage 5 is provided with a cooling heat exchanger 6 to be described later. Specifically, the cooling heat exchanger 6 and the heat storing unit 2 are connected by the cooling medium passage 5 configuring a closed circuit with the cooling heat exchanger 6 and the heat storing unit 2. Cooling medium is liquid transferring heat between the heat storing unit 2 and the cooling heat exchanger 6, and corresponds to a third thermal medium.

The cooling medium passage 5 configures a circuit independent from the cooling water passage 3. The cooling medium passage 5 is provided with a mechanical or electric second pump 51 configured to circulate cooling medium to the cooling medium passage 5.

The cooling heat exchanger 6 is configured to exchange heat between cooling medium cooled by cold heat emitted at the heat storing unit 2 and air to be blown to a vehicle interior as an air conditioning target space of an air conditioner for a vehicle to cool the blown air. For example, the cooling heat exchanger 6 may be a fin and tube heat exchanger configured to exchange heat between cooling medium flowing in a tube and blown air flowing outside the tube to cool the blown air.

Figure 2:
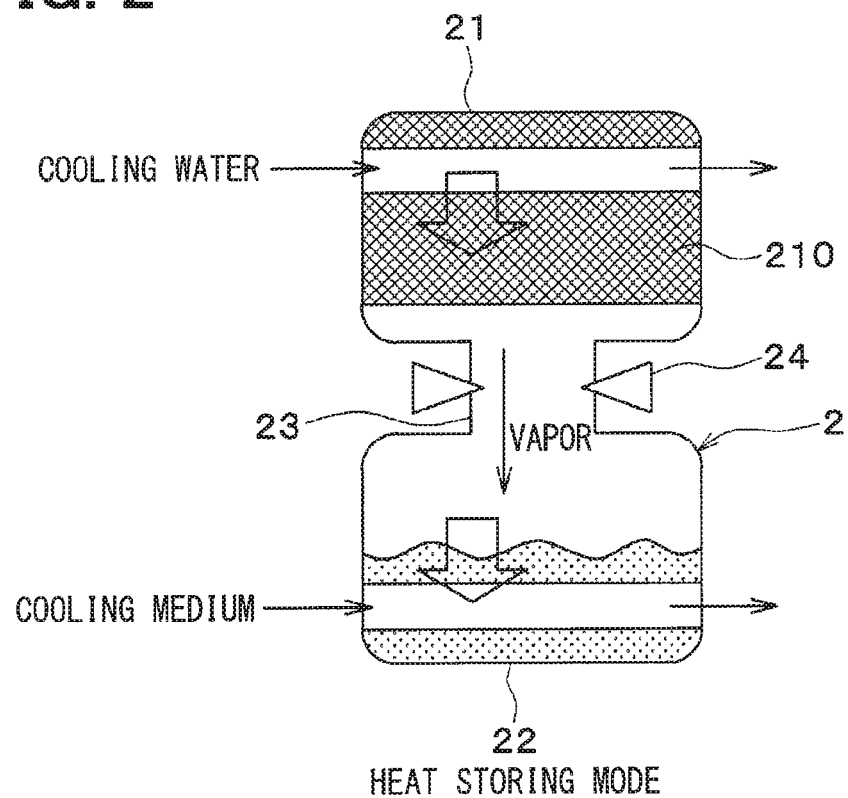
FIG. 2 is an explanatory view illustrating a state of a heat storing body at a heat storing mode according to the first embodiment.

The heat storing unit 2 according to the present embodiment will be now described in terms of its configuration. As depicted in FIG. 2, the heat storing unit 2 includes a heat storing body container 21, a thermal medium container 22, a vapor path 23, and the like.

The heat storing body container 21 is shaped as a vessel and contains a heat storing body 210 storing heat of cooling water having a temperature raised by heat exchange with waste heat of the engine 1. The heat storing body 210 will be detailed later.

The thermal medium container 22 is shaped as a vessel and contains a liquid thermal medium. The thermal medium is configured to change to a liquid phase when the thermal medium has a temperature not more than a first phase transition temperature and change to a vapor phase when the thermal medium has a temperature exceeding the first phase transition temperature. The present embodiment adopts water as the thermal medium. The thermal medium according to the present embodiment corresponds to a second thermal medium.

The thermal medium container 22 is configured to exchange heat between the thermal medium in the thermal medium container 22 and cooling medium flowing outside the thermal medium container 22. The thermal medium container 22 is configured to remove heat of the cooling medium to evaporate the thermal medium.

The vapor path 23 is configured to introduce vapor (water vapor herein) of the thermal medium generated in the thermal medium container 22 to the heat storing body container 21. The vapor path 23 is provided with an on-off valve 24 configured to open or close the vapor path 23.

The heat storing body 210 according to the present embodiment will be now detailed.

The heat storing body 210 is configured to change to a solid-state first phase when the heat storing body 210 has a temperature not more than a second phase transition temperature and change to a solid-state second phase when the heat storing body 210 has a temperature exceeding the second phase transition temperature. In other words, the heat storing body 210 is made of a material being solid both in the first phase and the second phase. The heat storing body 210 is configured to store or emit heat in accordance with phase change between the first phase and the second phase.

Figure 3:
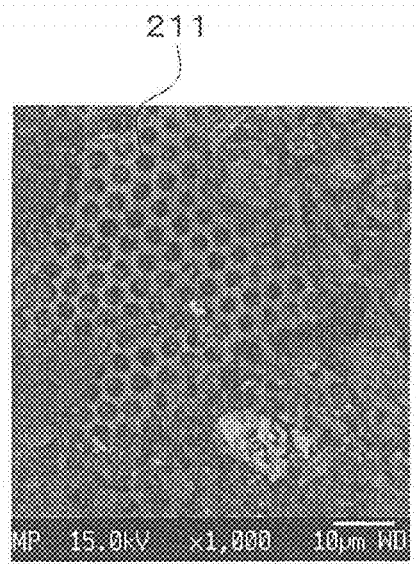
FIG. 3 is a photomicrograph of the heat storing body of the first embodiment.

As depicted in FIG. 3, the heat storing body 210 has a large number of pores 211. The heat storing body 210 is configured to cause a gaseous thermal medium (water vapor herein) to flow in to be absorbed in the pores 211.

The heat storing body 210 is made of a strongly correlated electron compound having strong Coulomb interaction among electrons of constitutive substances. The present embodiment adopts, as a porous strongly correlated electron compound of the heat storing unit 2, a compound containing at least transition metal and oxygen, specifically, porous vanadium dioxide ($VO_2$).

Referring again to FIG. 1, the heat storing system according to the present embodiment is configured to be switchable among a heat storing mode, a cold heat emission mode, and a hot heat emission mode. In the heat storing mode, the heat storing body 210 of the heat storing unit 2 stores heat of cooling water. In the cold heat emission mode, heat is exchanged between a liquid phase thermal medium (water herein) and cooling medium to evaporate the thermal medium so that cold heat is emitted to the cooling medium to cool the cooling medium. In the hot heat emission mode, hot heat stored in the heat storing body 210 of the heat storing unit 2 is emitted to the engine 1.

Specifically, operation in the heat storing mode is conducted by actuating the first pump 31 and the second pump 51 and opening the on-off valve 24 of the heat storing unit 2. As depicted in FIG. 2, in the heat storing mode, waste heat of the engine 1 is stored in the heat storing body 210 of the heat storing body container 21 via cooling water flowing in the cooling water passage 3. In other words, in the heat storing mode, the heat storing body 210 stores heat of cooling water having a temperature raised by heat exchange with the engine 1.

Furthermore, in the heat storing mode, the heat storing body 210 is heated with waste heat of the engine 1, in other words, heat of cooling water. Vapor of the thermal medium absorbed in the pores 211 of the heat storing body 210 is desorbed and flows into the thermal medium container 22 through the vapor path 23. The vapor of the thermal medium flowing into the thermal medium container 22 is cooled by the cooling medium to be condensed.

Figure 4:
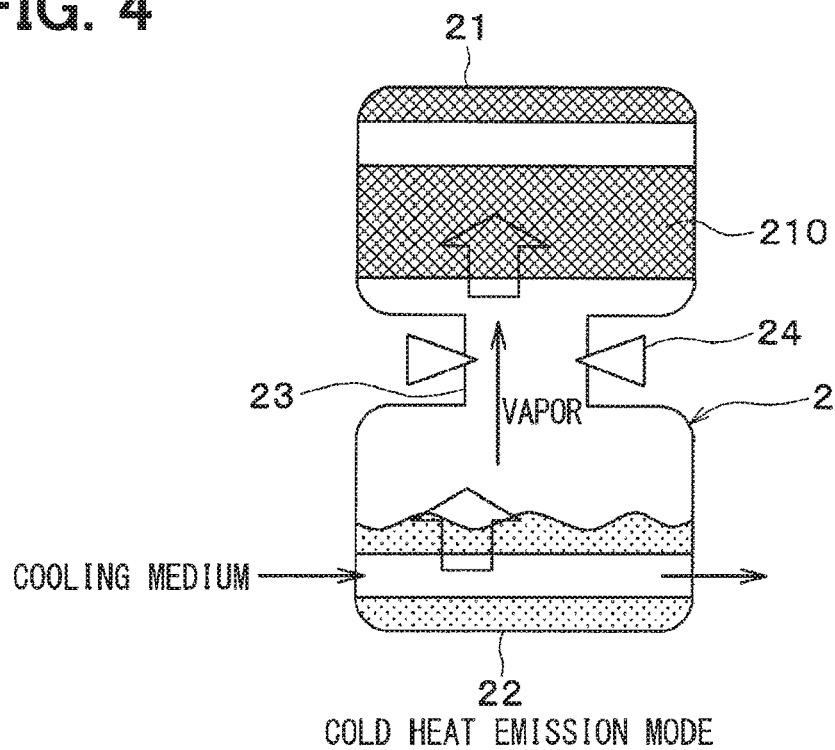
FIG. 4 is an explanatory view illustrating a state of the heat storing body at a cold heat emission mode according to the first embodiment.

Operation in the cold heat emission mode is conducted by stopping the first pump 31, actuating the second pump 51, and opening, the on-off valve 24 of the heat storing unit 2. As depicted in FIG. 4, in the cold heat emission mode, heat is exchanged between the liquid phase thermal medium in the thermal medium container 22 and the cooling medium flowing through the cooling medium passage 5 to evaporate the thermal medium. In this case, cold heat is emitted to the cooling medium to cool the cooling medium.

The vapor of the thermal medium obtained in the thermal medium container 22 flows into the heat storing body container 21 through the vapor path 23. The vapor of the thermal medium flowing into the heat storing body container 21 is absorbed in the pores 211 of the heat storing body 210.

The cooling medium cooled at the heat storing unit 2 (more specifically, in the thermal medium container 22) flows into the cooling heat exchanger 6 through the cooling medium passage 5. The cooling heat exchanger 6 exchanges heat between the cooling medium cooled at the heat storing unit 2 and blown air to cool the blown air. Specifically, in the cold heat emission mode, cold heat of the cooling medium cooled at the heat storing unit 2 is emitted to blown air to cool the blown air.

Figure 5:
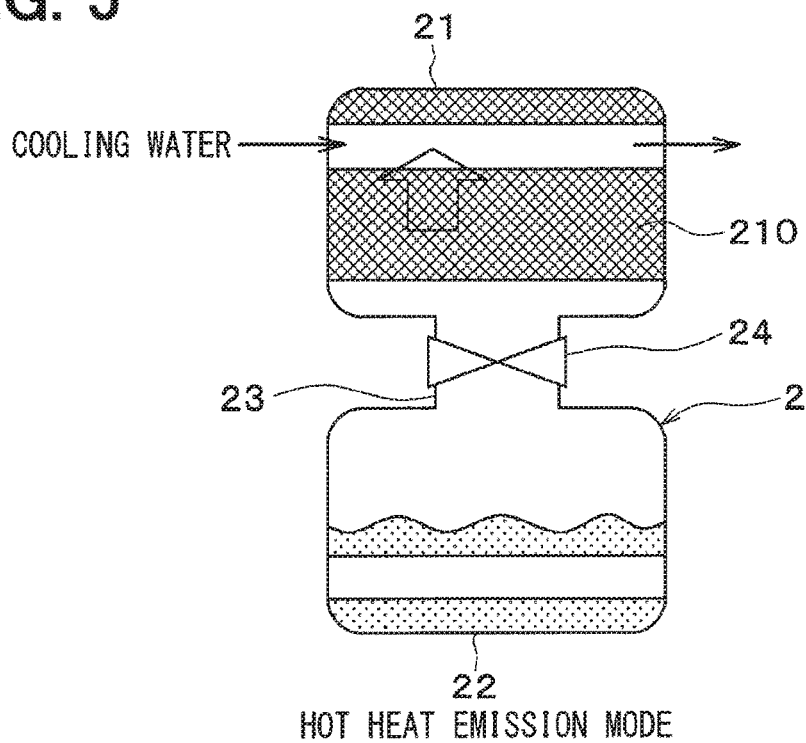
FIG. 5 is an explanatory view illustrating a state of the heat storing body at a hot heat emission mode according to the first embodiment.

Operation in the hot heat emission mode is conducted by actuating the first pump 31, stopping the second pump 51, and closing the on-off valve 24 of the heat storing unit 2. As depicted in FIG. 5, in the hot heat emission mode, heat stored in the heat storing body 210 of the heat storing body container 21 is emitted to the engine 1 via cooling water flowing in the cooling water passage 3. In other words, in the hot heat emission mode, heat of cooling water heated through heat exchange with the heat storing body 210 is emitted to the engine 1. The engine 1 according to the present embodiment thus corresponds to a heating target.

According to the present embodiment, operation in the heat storing mode is conducted in a steady state, in other words, when heat is excessive, to allow hot waste heat of the engine 1 to be stored in the heat storing unit 2 (more specifically, the heat storing body 210) via cooling water. Operation in the hot heat emission mode is conducted at start up, in other words, when heat is insufficient, to use heat stored in the heat storing unit 2 for heating the engine 1.

As described above, the heat storing body 210 according to the present embodiment is configured to store heat in accordance with phase change between the solid first phase state and the solid second phase state to achieve denser heat storing than a sensible heat storing body. This configuration achieves reduction in size of the heat storing system, specifically, the heat storing unit 2.

Furthermore, the heat storing unit 2 stores and emits hot heat with no chemical reaction, so that hot heat can be densely stored even in a case where the engine 1 has a low temperature. The heat storing unit 2 can thus store heat densely regardless of the temperature of the engine 1 as a heat source.

The heat storing unit 2 according to the present embodiment is configured to conduct operation in the cold heat emission mode by exchanging heat between the liquid phase thermal medium and the cooling medium and evaporating the thermal medium in the thermal medium container 22 to emit cold heat to the cooling medium and cool the cooling medium. Furthermore, the heat storing body 210 has the pores 211 allowing vapor of the cooling medium to flow thereinto, to absorb vapor of the thermal medium obtained in the thermal medium container 22 into the pores 211 of the heat storing body 210 in the cold heat emission mode. This configuration enables obtaining cold heat while the heat storing unit 2 is emitting heat.

The heat storing unit 2 according to the present embodiment is further configured to conduct operation in the hot heat emission mode by emitting hot heat stored in the heat storing body 210 of the heat storing unit 2 to the engine 1 to enable obtaining hot heat while the heat storing unit 2 is emitting heat.

Second Embodiment

The second embodiment will be described with reference to FIG. 6. The second embodiment is different from the first embodiment in that the heat storing unit 2 is configured to simultaneously conduct operation in the cold heat emission mode and operation in the hot heat emission mode.

Figure 6:
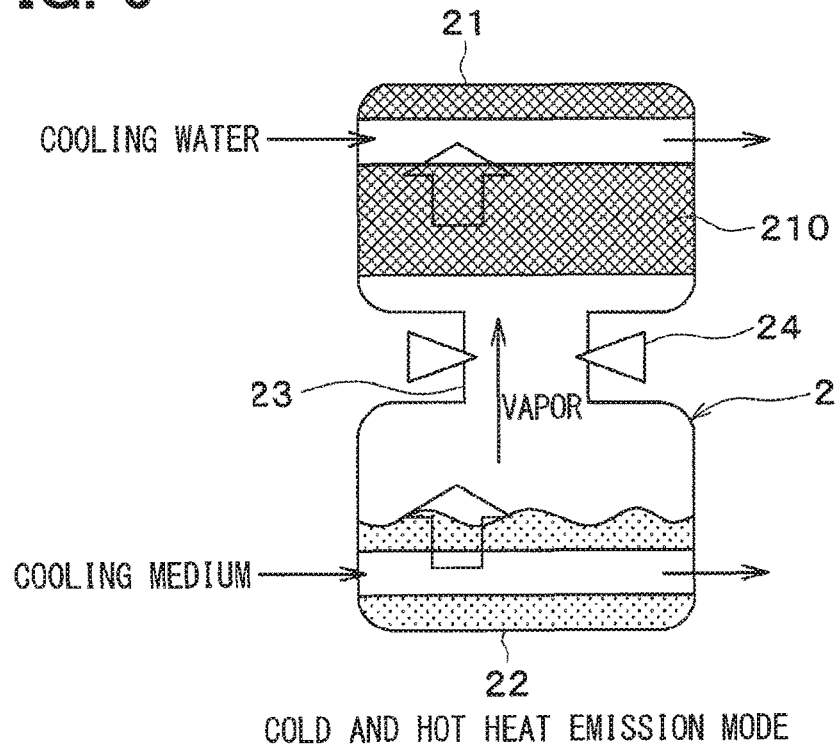
FIG. 6 is an explanatory view illustrating a state of a heat storing body at a cold and hot heat emission mode according to a second embodiment.

As depicted in FIG. 6, the heat storing unit 2 according to the present embodiment is configured to be switchable between the heat storing mode and a cold and hot heat emission mode. In the cold and hot heat emission mode, cold heat is emitted to cooling medium and hot heat stored in the heat storing body 210 of the heat storing unit 2 is emitted to the engine 1.

Operation in the cold and hot heat emission mode is conducted by actuating the first pump 31 and the second pump 51 and opening the on-off valve 24 of the heat storing unit 2. In the cold and hot heat emission mode, heat is exchanged between the liquid phase thermal medium in the thermal medium container 22 and the cooling medium flowing through the cooling medium passage 5 to evaporate the thermal medium. In this case, cold heat is emitted to the cooling medium to cool the cooling medium.

Vapor of the thermal medium obtained in the thermal medium container 22 flows into the heat storing body container 21 through the vapor path 23 and is absorbed in the pores 211 of the heat storing body 210.

Furthermore, in the cold and hot heat emission mode, heat stored in the heat storing body 210 of the heat storing unit 2 is emitted to the engine 1 via cooling water flowing in the cooling water passage 3.

As described above, the heat storing unit 2 according to the present embodiment is configured to conduct operation in the cold and hot heat emission mode. This configuration enables simultaneously obtaining both hot heat and cold heat while the heat storing unit 2 is emitting heat.

Third Embodiment

The third embodiment will be described with reference to FIG. 7. The third embodiment is different from the first embodiment in that the heat storing unit 2 is configured to store heat of both cooling water and exhaust gas.

Figure 7:
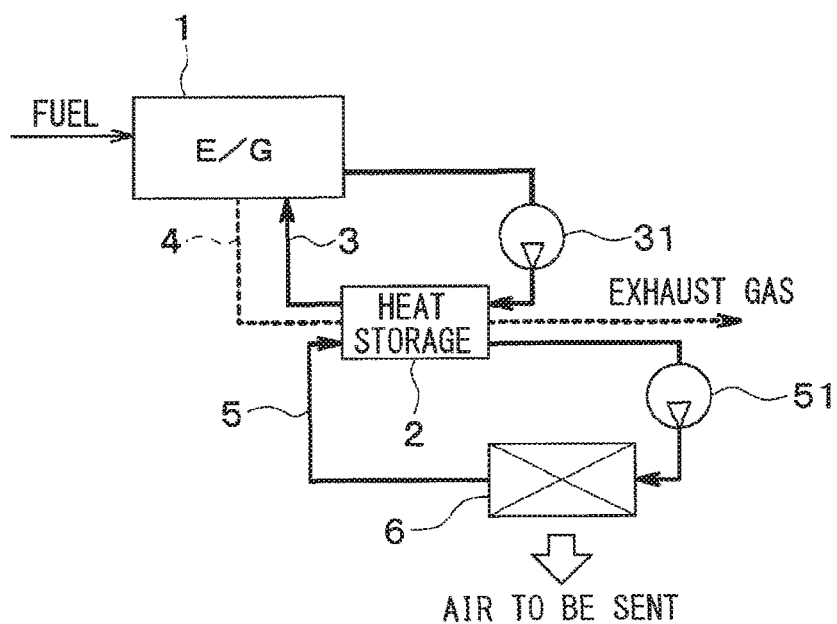
FIG. 7 is a diagram illustrating a whole configuration of a heat storing system according to a third embodiment.

As depicted in FIG. 7, the engine 1 emits heat to both cooling water and exhaust gas upon converting fuel as externally supplied energy to motive power as another form of energy. The cooling water and the exhaust gas according to the present embodiment thus correspond to a first thermal medium.

The heat storing body container 21 of the heat storing unit 2 is connected with both the cooling water passage 3 and the exhaust gas passage 4. The heat storing body 210 in the heat storing body container 21 thus stores heat of cooling water flowing in the cooling water passage 3 and heat of exhaust gas flowing in the exhaust gas passage 4.

In the heat storing mode according to the present embodiment, waste heat of the engine 1 is stored in the heat storing body 210 of the heat storing body container 21 via cooling water flowing in the cooling water passage 3 and exhaust gas flowing in the exhaust gas passage 4. In other words, in the heat storing mode, the heat storing body 210 stores heat of cooling water having a temperature raised by heat exchange with the engine 1, and heat of exhaust gas.

As described above, the heat storing body container 21 of the heat storing unit 2 according to the present embodiment is connected with both the cooling water passage 3 and the exhaust gas passage 4. This configuration enables the heat storing unit 2 to store waste heat of the engine 1 via both of cooling water and exhaust gas.

Fourth Embodiment

The fourth embodiment will be described with reference to FIG. 8. The fourth embodiment is different from the first embodiment in that blown air is replaced with a battery as a cooling target in the cold heat emission mode.

Figure 8:
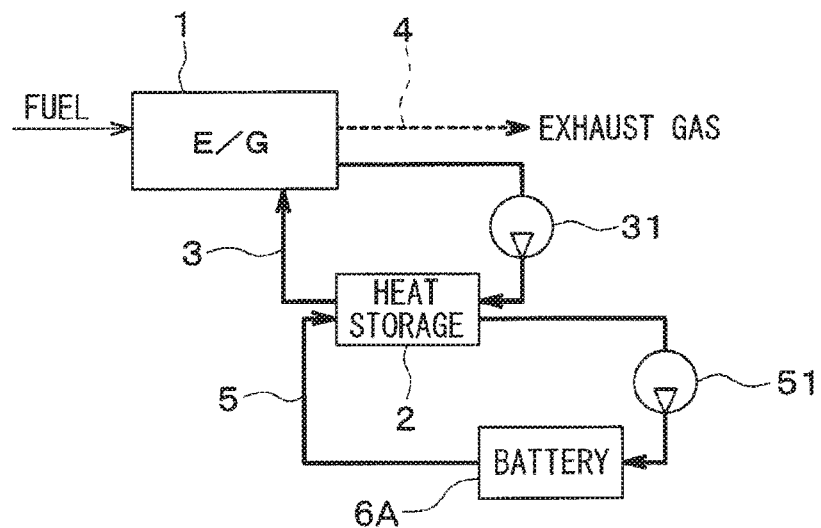
FIG. 8 is a diagram illustrating a whole configuration of a heat storing system according to a fourth embodiment.

As depicted in FIG. 8, the cooling medium passage 6 according to the present embodiment is provided with a battery 6A configured to store electricity converted by a generator (not depicted). The battery 6A is a heat generator that generates heat, and heat is transferred between the battery 6A and the cooling medium.

In the cold heat emission mode according to the present embodiment, cold heat of the cooling medium cooled at the heat storing unit 2 (more specifically, in the thermal medium container 22) is emitted to the battery 6A. The battery 6A is thus cooled.

Fifth Embodiment

The fifth embodiment will be described with reference to FIG. 9. The fifth embodiment is different from the first embodiment in that blown air is adopted as a heating target.

Figure 9:
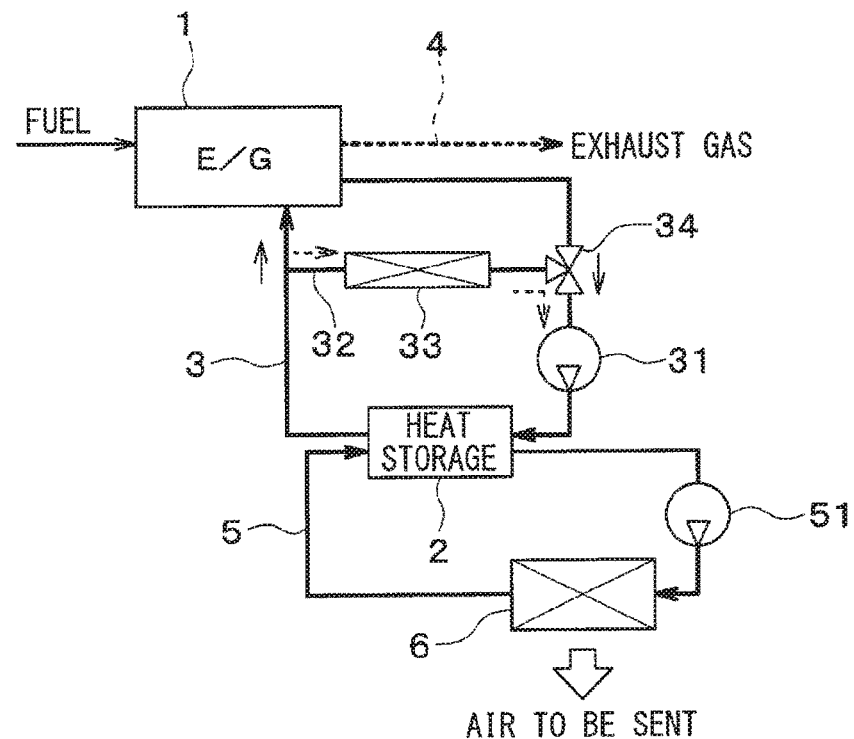
FIG. 9 is a diagram illustrating a whole configuration of a heat storing system according to a fifth embodiment.

As depicted in FIG. 9, the cooling water passage 3 is connected with a heater core passage 32. The heater core passage 32 allows cooling water to flow in parallel with the heat storing unit 2. The heater core passage 32 is provided with a heater core 33.

The heater core 33 is a heat exchanger configured to exchange heat between cooling water heated with heat stored in the heat storing unit 2 and air blown by a fan (not depicted) to heat the blown air. For example, the heater core 33 may be a fin and tube heat exchanger configured to exchange heat between cooling water flowing in a tube and blown air flowing outside the tube to heat the blown air.

The cooling water passage 3 and the heater core passage 32 form a branching point provided with a three-way valve 34 configured to switch a cooling water circuit for flowing cooling water. The three-way valve 34 has a function of switching between a first state where cooling water flowing out of the engine 1 flows through the heat storing unit 2 and flows into the engine 1 again, and a second state where cooling water flowing out of the heat storing unit 2 flows through the heater core 33 and flows into the heat storing unit 2 again.

Operation in the heat storing mode according to the present embodiment is conducted by actuating the first pump 31 and the second pump 51, opening the on-off valve 24 of the heat storing unit 2, and controlling the three-way valve 34 to switch into the first state. As indicated by solid arrows in FIG. 9, in the heat storing mode according to the present embodiment, waste heat of the engine 1 is stored in the heat storing body 210 of the heat storing unit 2 via cooling water flowing in the cooling water passage 3.

Operation in the hot heat emission mode according to the present embodiment is conducted by actuating the first pump 31, stopping the second pump 51, closing the on-off valve 24 of the heat storing unit 2, and controlling the three-way valve 34 to switch into the second state.

As indicated by broken arrows in FIG. 9, in the hot heat emission mode according to the present embodiment, hot heat stored in the heat storing body 210 of the heat storing unit 2 is emitted to cooling water flowing in the cooling water passage 3 to heat the cooling water. The cooling water heated at the heat storing unit 2 flows into the heater core 33 through the cooling water passage 3 and the heater core passage 32. The heater core 33 exchanges heat between the cooling water heated at the heat storing unit 2 and blown air to heat the blown air.

Specifically, in the hot heat emission mode, hot heat of the cooling water heated at the heat storing unit 2 is emitted to blown air to heat the blown air. The blown air according to the present embodiment thus corresponds to a heating target.

According to the present embodiment, operation in the heat storing mode is conducted in a steady state, in other words, when heat is excessive, to store hot waste heat of the engine 1 in the heat storing unit 2 (more specifically, the heat storing body 210) via cooling water. Operation in the hot heat emission mode is conducted while the engine 1 is stopped, in other words, heat for heating blown air is insufficient, to allow heat stored in the heat storing unit 2 to be used for heating.

Sixth Embodiment

Figure 10:
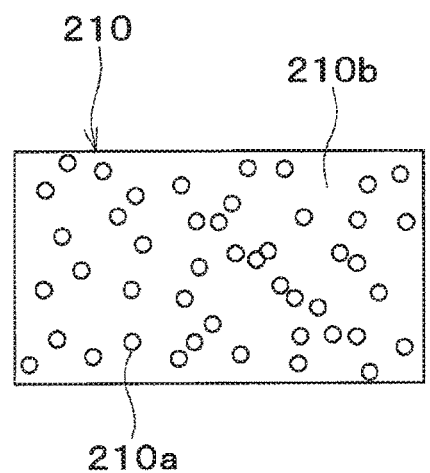
FIG. 10 is a schematic diagram illustrating a heat storing body according to a sixth embodiment.

The sixth embodiment be described hereafter referring to FIG. 10. The sixth embodiment is different from the first embodiment in a configuration of the heat storing body 210.

As shown in FIG. 10, the heat storing body 210 is configured by a compound that includes a strongly correlated electron system compound 210a and a filler (reinforcement member) 210b that is a inorganic compound. According to the present embodiment, the heat storing body 210 is configured by $VO_2$ and ceramics.

As a result, a mechanical strength of the heat storing body 210 can be improved. A heat storing amount of the heat storing body 210 can be changed by changing a compounding ratio between the strongly correlated electron system compound 210a and the filler 210b.

Seventh Embodiment

The seventh embodiment will be described hereafter referring to FIG. 11. The seventh embodiment is different from the first embodiment in a configuration of the heat storing body 210.

Figure 11:
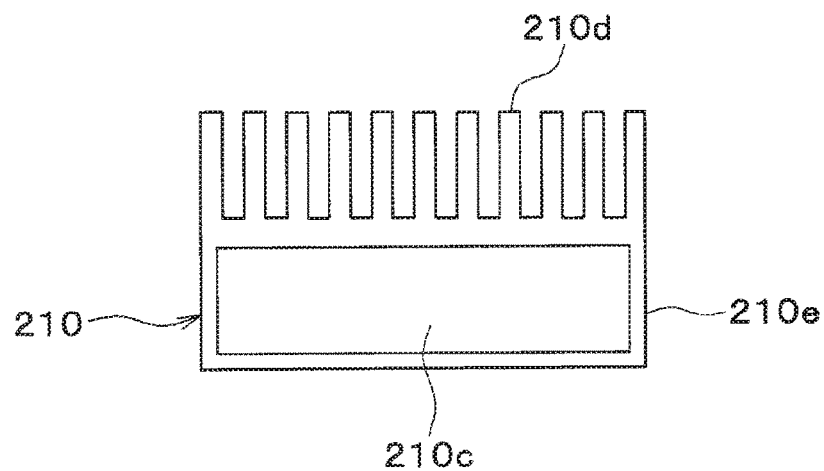
FIG. 11 is a schematic diagram illustrating a heat storing body according to a seventh embodiment.

As shown in FIG. 11, the heat storing body 210 has a body portion (heat storing layer) 210c that is made of a strongly correlated electron system compound and a fin (heat transfer part) 210d that increases a heat transfer area transferring heat for the body portion 210c. The fin 210d is made of metal that has greater heat conductivity than the body portion 210c.

The body portion 210c is covered with a high heat conductivity layer 210e that is made of metal having greater heat conductivity than the heat storing body configuring the body portion 210c. The high heat conductivity layer 210e is made of the same material as the fin 210d and configured integrally with the fin 210d. According to the present embodiment, the body portion 210c is made of $VO_2$, and the high heat conductivity layer 210e and the fin 210d are made of $V_2O_3$.

According to the present embodiment, the surface area of the heat storing body 210 can be increased by arranging the fin 210d to the heat storing body 210, such that the adsorption properties of vapor of the thermal medium can be improved.

Other Embodiment

It should be understood that the present disclosure is not limited to the above-described embodiments and intended to cover various modification within a scope of the present disclosure as described hereafter. Technical features disclosed in the above-described embodiments may be combined as required in a feasible range.

In the first embodiment, the heat storing body 2 is configured to execute three modes, such as the heat storing mode, the cold heat emission mode, and the hot heat emission mode. However, the heat storing body 2 is not limited to the above. For example, the heat storing body 2 may be configured to execute two modes, such as the heat storing mode and the cold heat emission mode.

In the above embodiments (except the third embodiment), the cooling water is adopted as the first thermal medium. However, the first thermal medium is not limited to the cooling water. For example, gas exhausted from the engine 1 may be adopted as the first thermal medium.

In the embodiment, the engine 1 or air is adopted as a heating target to which the hot heat stored in the heat storing body 2 is emitted. The heating target is not limited to the above. For example, the heating target may be catalyst, AFT (Automatic Transmission Fluid) or engine oil. Further, when the engine 1 is a diesel engine, the heating target may be a DPF (Diesel Particulate Filter) that is disposed in the exhaust passage 4 of the engine 1.

In the fourth embodiment, the battery 6A is adopted as the heat generator that is a cooling target at the cold heat emission mode. The heat generator is not limited to the above. For example, an inverter, a motor and the like may be adopted as the heat generator.

In the above-described embodiments, the heat storing system is applied to a vehicle heat storing system for a hybrid vehicle, however the heat storing system is not limited to that usage.

For example, the heat storing system may be applied to an air conditioner for an electric vehicle (including a fuel cell vehicle) that generates driving force for moving the vehicle by an electric motor for moving the vehicle, or to an air conditioner for a regular vehicle that generates driving force for moving the vehicle by an engine. In addition, the heat storing system is not limited to be used in a vehicle and may be used for a stationary heat storing system.

In the above-described embodiments, the engine as the energy converter is used as a heat source that generates heat and radiates the heat to the first thermal medium, however the heat source is not limited to the example. For example, the heat source may be an electric device such as a fuel cell or an electric motor for moving the vehicle when the heat storing system is applied to a vehicle heat storing system.

The invention claimed is:

1. A heat storing system comprising:
a heat source that generates heat and emits the heat to a first thermal medium; and
a heat storing unit including a heat storing body storing heat, wherein:
the heat storing unit includes
a heat storing body container housing the heat storing body, and
a thermal medium container housing a liquid-state second thermal medium that is evaporated by removing heat of a third thermal medium flowing outside the thermal medium container,
the heat storing body container is configured to receive vapor of the second thermal medium generated in the thermal medium container,
the heat storing body has a pore receiving the vapor of the second thermal medium,
the heat storing body is configured to change to a solid-state first phase when the heat storing body has a temperature not more than a phase transition temperature and change to a solid-state second phase when the heat storing body has a temperature exceeding the phase transition temperature,
the heat storing body is configured to store or emit heat in accordance with phase change between the first phase and the second phase, and
the heat storing unit is configured to be switchable between
a heat storing mode to store heat of the first thermal medium in the heat storing body by heat exchange between the first thermal medium and the heat storing body in the heat storing body container, and
a cold heat emission mode to cool the third thermal medium by emitting cold heat to the third thermal medium through heat exchange between the liquid-phase second thermal medium and the third thermal medium in the thermal medium container to evaporate the second thermal medium.

2. The heat storing system according to claim 1, wherein the heat storing unit is configured to be switchable among a hot heat emission mode in which hot heat stored in the heat storing body is emitted to a heating target, the cold heat emission mode, and the heat storing mode.

3. The heat storing system according to claim 2, wherein the heat storing unit is configured to simultaneously conduct operation in the cold heat emission mode and operation in the hot heat emission mode.

4. The heat storing system according to claim 2, wherein, in the hot heat emission mode, hot heat stored in the heat storing body is emitted to the heating target to heat the heating target.

5. The heat storing system according to claim 2, wherein the heating target is air to be blown into an air conditioning target space of an air conditioner.

6. The heat storing system according to claim 1, wherein, in the cold heat emission mode, cold heat of the third thermal medium cooled at the heat storing unit is emitted to a heat generator that generates heat.

7. The heat storing system according to claim 1, wherein, in the cold heat emission mode, cold heat of the third thermal medium cooled at the heat storing unit is emitted to air to be blown into an air conditioning target space of an air conditioner.

8. The heat storing system according to claim 1, wherein the heat storing body is porous vanadium dioxide.

9. The heat storing system according to claim 1, wherein the heat storing body is configured by a compound that includes a strongly correlated electron system compound and an inorganic compound.

10. The heat storing system according to claim 1, wherein the heat storing body has
    a heat storing layer that is made of a strongly correlated electron system compound, and
    a heat transfer part that increases a heat transfer area for the heat storing layer.

\* \* \* \* \*